(12) United States Patent
Castoldi et al.

(10) Patent No.: US 8,855,483 B2
(45) Date of Patent: Oct. 7, 2014

(54) RESTORATION SCHEME FOR AN OPTICAL NETWORK AND METHOD OF USING SUCH A SCHEME

(75) Inventors: Piero Castoldi, Pisa (IT); Filippo Cugini, Fidenza (IT); Nicola Sambo, Pisa (IT); Isabella Cerutti, Pisa (IT); Alessio Giorgetti, Pisa (IT); Luca Valcarenghi, Pisa (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 782 days.

(21) Appl. No.: 13/119,520

(22) PCT Filed: Sep. 19, 2008

(86) PCT No.: PCT/EP2008/062533
§ 371 (c)(1),
(2), (4) Date: Jun. 6, 2011

(87) PCT Pub. No.: WO2010/031443
PCT Pub. Date: Mar. 25, 2010

(65) Prior Publication Data
US 2011/0229122 A1    Sep. 22, 2011

(51) Int. Cl.
*H04B 10/00* (2013.01)
*H04J 14/02* (2006.01)
*H04Q 11/00* (2006.01)

(52) U.S. Cl.
CPC ......... *H04Q 11/0062* (2013.01); *H04J 14/0279* (2013.01); *H04Q 2011/0073* (2013.01); *H04Q 2011/0081* (2013.01); *H04J 14/025* (2013.01); *H04J 14/0227* (2013.01); *H04J 14/0246* (2013.01); *H04Q 2011/0086* (2013.01); *H04J 14/0284* (2013.01)
USPC .................................... 398/5; 398/6; 398/19

(58) Field of Classification Search
USPC ................................. 398/5–7, 17, 19
See application file for complete search history.

(56) References Cited

U.S. PATENT DOCUMENTS 8,150,257 B1 * 4/2012 Choudhury et al. .............. 398/5
2004/0258409 A1 * 12/2004 Sadananda ...................... 398/50
(Continued)

OTHER PUBLICATIONS

International Search Report for PCT/EP2008/062533, mailed Jul. 14, 2009.
(Continued)

*Primary Examiner* — Dzung Tran
(74) *Attorney, Agent, or Firm* — Baker Botts L.L.P.

(57) ABSTRACT

A method of restoration for an optical network, the network comprising a plurality of nodes (40, 50) interconnected with each other by optical links (130), a subset of the nodes (40) each comprising a regenerator, the method comprising: storing 160) a quality of transmission parameter and a regenerator availability at each of the plurality of nodes (40, 50); notifying (170) a branch node (110) in response to detecting a failure (140) within a link (130) forming part of the path between a source node (20) and a destination node (30), wherein the branch node (110) is the neighbouring upstream node (40, 50) upstream of the link failure (140), the branch node (110) having a regenerator; the branch node (110) computing (190) a restoration segment (100) to a merge node (120) having a regenerator which is a neighbouring downstream node which is downstream of the link failure (140), the restoration path (100) being based on the quality of transmission parameter and regenerator availability information; restoring (180) the path between the source node (20) and the destination node (30) using the restoration segment (100).

23 Claims, 8 Drawing Sheets

(56) References Cited

U.S. PATENT DOCUMENTS

2006/0256712 A1* 11/2006 Imajuku et al. ............... 370/218
2007/0183317 A1* 8/2007 Vasseur et al. ................ 370/225

OTHER PUBLICATIONS

Banerjee, A. et al., "Generalized Multiprotocol Label Switching: An Overview of Signaling Enhancements and Recovery Techniques", IEEE Communications Magazine, vol. 39, No. 7, (Jul. 1, 2001), pp. 144-151.

Sambo, N. et al., "Lightweight RSVP-TE extensions to account for Shared Regenerators in Translucent Optical Networks", Photonics in Switching, (Aug. 1, 2007), pp. 35-36.

* cited by examiner

RESTORATION SCHEME FOR AN OPTICAL NETWORK AND METHOD OF USING SUCH A SCHEME

This application is the U.S. national phase of International Application No. PCT/EP2008/062533, filed 19 Sep. 2008, which designated the U.S., the entire contents of which is hereby incorporated by reference.

FIELD OF THE INVENTION

This invention relates, in general, to optical communication networks and particularly to a method and system for the restoration of such a network.

BACKGROUND OF THE INVENTION

One of the major advantages of an optical communication system is the capability of transporting very large amounts of data at very high data throughput rates. An optical communication system typically is formed of a fiber optic network having optical fibers through which optical energy is communicated to communicate data between communication endpoints.

Telecommunications carriers (e.g., long distance providers) continually strive to increase the reliability of their communications networks. They do this, in part, by increasing the speed by which they can restore network operation following failure in one or more components of the network. A communications network consists of a collection of transmission links, also known as segments that are interconnected at network nodes. The segments may include transmission lines, fiber optic cables, microwave links, and other such transmission medium. Traffic is transmitted on the network from one endpoint to another endpoint through a current route or "trunk," which is a network path of segments that interconnect the endpoints. The network nodes may serve a variety of functions such as amplifying the network traffic for transmission down the next segment in the route or establishing an interconnection between two segments connected to the node (i.e., a switch). Each node is located at an installation, and several nodes may be located within a single installation. A regenerator node is a node which is capable of signal regeneration within an optical communication system and can be controlled locally or from a remote computer system to connect or to disconnect segments that are connected to the node. Segments are connected to individual ports of a regenerator node.

As in any communication system, a receiving endpoint must be able to recreate the informational content of the communicated data. The data, when delivered to the communication endpoint, is of sufficient quality that the informational content of the data may still be recovered. Examples of transmission impairments which may result in the quality of the received signal being impacted are signal to noise ratio, chromatic dispersion, polarization mode dispersion and self phase modulation. The degree to which a received signal quality will be reduced by these impairments is dependent on the data being transmitted and the specific characteristics of the converters at each end of the transmission system.

Network outages develop when a discontinuity occurs within the network architecture. A discontinuity within the network may result for reasons such as, a natural disaster, accidental or intentional human intervention, or faulty network components. For example, a segment that is a buried fiber optic cable may fail as a result of being inadvertently severed by someone digging near the buried cable. If one or more of the cables fail, massive disruption of services to a large number of network customers could result. Regardless of the cause of the network outage, however, the communication within the network must be restored as promptly as possible to avoid unnecessary and costly disruptions in communication.

Generally, there are three types of restoration schemes: dedicated restoration, shared restoration, and best effort restoration. In dedicated restoration, the capacity of a protection, or restoration, path is reserved for an individual demand. In shared restoration, the restoration capacity is reserved, but shared across multiple demands. In best effort restoration, no reservation is made and restoration capacity is allocated in real time on an as-available basis. The first two classes of restoration both have guaranteed restoration in the event of a single failure; however, they differ in restoration time, as shared restoration requires real-time path setup.

Generalized Multiprotocol Label Switching (GMPLS) is the next-generation implementation of Multiprotocol Label Switching (MPLS). GMPLS extends the functionality of MPLS to include a wider range of label-switched path (LSP) options for a variety of network devices. GMPLS divides an optical network into two network planes, including a data plane and a control plane. The data plane functions to transmit network data traffic to consist of different types of network switches such as MPLS switches, optical cross connect (OXC) and digital cross connect (DXC). Corresponding to the data plane, the control plane offers control functionalities to control the switches in the data plane.

Signaling component functions to establish, modify, and delete network service connections. For a new network service request, a connection needs to be established between a node pair. Sometimes, an existing connection may be modified in aspects such as bandwidth and traversing route. Also, an existing service may expire after some time. Then the signaling protocol should release the connection and free the resources of the connection. Currently, Resource Reservation Protocol—Traffic Engineering (RSVP-TE) protocol is the most popular signaling protocol for this purpose. Resource Reservation Protocol (RSVP) is a transport layer protocol designed to reserve resources across a communication network. RSVP can be used to request or deliver specific levels of quality of service (QoS) for application data streams or flows. RSVP defines how applications place reservations and how they can relinquish the reserved resources once the need for them has ended. RSVP operation will generally result in resources being reserved in each node along a path. RSVP is not itself a routing protocol and was designed to interoperate with current and future routing protocols. RSVP by itself is rarely deployed in telecommunications networks today but the traffic engineering extension of RSVP, or RSVP-TE, is becoming more widely accepted nowadays in many QoS-oriented networks.

Translucent networks (i.e., with a limited number of regenerators placed in few nodes) offer an efficient bandwidth utilization and guarantee lightpath quality of transmission (QoT). A limited number of opto-electronic regenerators, shared at the nodes, allows to efficiently aggregate traffic and to perform the 3R regeneration required to assure lightpath QoT. Lightpath routing with guaranteed QoT can be performed by an enhanced version of the GMPLS control plane, during both the provisioning and the restoration phases.

To ensure survivability against single link failures, segment protection is used that efficiently shares the regenerators between the working and protection routes. To date, GMPLS-controlled translucent networks are mainly focused on the provisioning phase. The main problem with this issue is that the current GMPLS protocol suite does not encompass regenerator presence. To overcome this issue, in extensions of RSVP-TE protocols are used to disseminate information about regenerator availability during the provisioning phase. However, in dynamic traffic conditions, such as during restoration, regenerator availability information can be inaccurate.

Any discussion of documents, acts or knowledge in this specification is included to explain the context of the invention. It should not be taken as an admission that any of the material forms part of the prior art base or the common general knowledge in the relevant art.

SUMMARY OF THE INVENTION

According to a first aspect, the present invention provides a method of restoration for an optical network, the network comprising a plurality of nodes interconnected with each other by optical links, a subset of the nodes each comprising a regenerator, the method comprising: storing a quality of transmission parameter and a regenerator availability at each of the plurality of nodes; notifying a branch node in response to detecting a failure within a link forming part of the path between a source node and a destination node, wherein the branch node is the neighbouring upstream node upstream of the link failure, the branch node having a regenerator; the branch node computing a restoration path to a merge node having a regenerator which is a neighbouring downstream node which is downstream of the link failure, the restoration path being based on the quality of transmission parameter and regenerator availability information; restoring the path between the source node and the destination node using the restoration path.

Passing a resource reservation request to each of the plurality of nodes may be used for storing the quality of transmission parameter and regenerator availability. If the quality of transmission may be guaranteed on the restoration path, the branch node sends a reservation request teardown message to the merge node to free resources along the failed segment, wherein the branch node sends a reservation path message to the merge node to gather the quality of transmission parameter and regenerator availability stored at each of the plurality of nodes along the restoration segment, the merge node selects an available wavelength and sends the branch node a reservation message to reserve the resources for restoration of the failed optical segment. If the quality of transmission may not be guaranteed a reservation notify message is sent to the source node by the branch node upon receiving the reservation notify message the source node computes a restoration path to the destination node and selects an intermediate regenerator node to ensure the quality of transmission, a reservation message exchange is triggered from the source node to the destination node to free resources along the failed optical path and to reserve resources on the restoration path. The optical network may comprise a generalised multi-protocol label switching (GMPLS) control plane.

According to a further aspect, the present invention provides an optical network, comprising a plurality of nodes interconnected with each other by optical links; a subset of nodes each comprising a regenerator, the apparatus comprising: a database for storing a quality of transmission parameter and a regenerator availability at each of the plurality of nodes; a source node and a destination node; a branch node arranged to receive a notification in response to a failure within a link forming part of the path between the source node and the destination node, wherein the branch node is the neighbouring upstream node upstream of a link failure, the branch node having a regenerator; the branch node is further arranged to compute a restoration segment to a merge node; the merge node having a regenerator, the merge node is a neighbouring downstream node which is downstream of the link failure, the restoration segment being based on the quality of transmission parameter and regenerator availability information; the network arranged to restore the path between the source node and the destination node using the restoration path.

Passing a resource reservation request to each of the plurality of nodes may be used for storing the quality of transmission parameter and regenerator availability. If the quality of transmission may be guaranteed on the restoration path the branch node sends a reservation request teardown message to the merge node to free resources along the failed segment, wherein the branch node sends a reservation path message to the merge node to gather the quality of transmission parameter and regenerator availability stored at each of the plurality of nodes along the restoration segment, the merge node selects an available wavelength and sends the branch node a reservation message to reserve the resources for restoration of the failed optical segment. If the quality of transmission may not be guaranteed a reservation notify message is sent to the source node by the branch node upon receiving the reservation notify message the source node computes a restoration path to the destination node and selects an intermediate regenerator node to ensure quality of transmission, a reservation message exchange is triggered from the source node to the destination node to free resources along the failed optical path and to reserve resources on the restoration path. The optical network may comprise a generalised multi-protocol label switching (GMPLS) control plane.

According to a still further aspect, the present invention provides a node for an optical network, comprising a plurality of nodes interconnected with each other by optical links, a subset of the nodes each comprising a regenerator, the node comprising: a regenerator; a database for storing a quality of transmission parameter and a regenerator availability; the node is arranged to support a path between a source node and a destination node; the node is adapted to receive notification of a link failure within a link forming part of the path between a source node and a destination node, the node is the neighbouring upstream node from the link failure; wherein the node computes a restoration segment to a merge node, the restoration segment being based on the quality of transmission parameter and regenerator availability information.

Restoring the path between the source node and the destination node may be by using the restoration path. Passing a resource reservation request to each of the plurality of nodes may be for storing the quality of transmission parameter and regenerator availability. If the quality of transmission may be guaranteed on the restoration path the node sends a reservation request teardown message to the merge node to free resources along the failed segment, wherein the node sends a reservation path message to the merge node to gather the quality of transmission parameter and regenerator availability stored at each of the plurality of nodes along the restoration segment, the merge node selects an available wavelength and sends the node a reservation message to reserve the resources for restoration of the failed optical segment. If the quality of transmission may not be guaranteed a reservation notify message is sent to the source node by the node upon receiving the reservation notify message the source node computes a restoration path to the destination node and selects an intermediate regenerator node to ensure quality of transmission, a reservation message exchange is triggered from the source node to the destination node to free resources along the failed optical path and to reserve resources on the restoration path. The optical network may comprise a generalised multi-protocol label switching (GMPLS) control plane. The quality of transmission parameter and the regenerator availability information may be enabled into the GMPLS control plane using extensions of RSVP-TE.

According to a still further aspect, the present invention provides a method of operating a node in an optical network, the node comprising a regenerator and the network comprising a plurality of other nodes interconnected with each other by optical links, a subset of the other nodes each comprising a regenerator, the method comprising: storing a quality of transmission parameter and a regenerator availability at the node; notifying the node in response to detecting a failure within a link forming part of the path between a source node and a destination node, wherein the node is the neighbouring upstream node upstream of the link failure; computing a restoration path to a merge node having a regenerator which is a neighbouring downstream node which is downstream of the link failure, the restoration path being based on the quality of transmission parameter and regenerator availability information; restoring the path between the source node and the destination node using the restoration path Passing a resource reservation request to each of the plurality of nodes may be for storing the quality of transmission parameter and regenerator availability. If the quality of transmission may be guaranteed on the restoration path, the node sends a reservation request teardown message to the merge node to free resources along the failed link, wherein the node sends a reservation path message to the merge node to gather the quality of transmission parameter and regenerator availability stored at each of the plurality of nodes along the restoration segment, the merge node selects an available wavelength and sends the node a reservation message to reserve the resources for restoration of the failed optical segment. If the quality of transmission may not be guaranteed a reservation notify message may be sent to the source node by the node upon receiving the reservation notify message the source node computes a restoration path to the destination node and selects an intermediate regenerator node to ensure the quality of transmission, a reservation message exchange is triggered from the source node to the destination node to free resources along the failed optical path and to reserve resources on the restoration path. The optical network may comprise a generalised multi-protocol label switching (GMPLS) control plane. The quality of transmission parameter and the regenerator availability information may be enabled into the GMPLS control plane using extensions of RSVP-TE.

A segment restoration scheme reduces regenerator blocking in comparison with a path restoration scheme. In a segment restoration scheme fewer regenerators are needed to be specifically reserved during restoration and thus inaccurate information on regenerator availability has less impact on the blocking. Forward blocking becomes significant in a segment restoration scheme for high traffic loads. This is due to the high concentration of restoration segments (and thus the high resource usage) on the links around the failed link. Forward blocking is experienced by a path restoration scheme, however to a less degree than in a segment restoration scheme because backup path links are widespread. For the same reason, in a segment restoration scheme, resource contentions are more probable and backward blocking experienced by the segment restoration scheme is higher than in the path restoration scheme. The overall restoration blocking probability versus the traffic load shows that the segment restoration scheme achieves lower blocking probability than that of the path restoration scheme.

Finally, when both the segment restoration scheme and the path restoration schemes are compared in terms of mean restoration time, as defined as the mean time between the failure and the instant in which a reservation message reaches a segment restoration initiating node or the source node in a path restoration scheme. It is shown that for the segment restoration scheme a significant decrease in the restoration time is achieved.

The various features of novelty which characterize the present invention are pointed out with particularity in the claims annexed to and forming part of this disclosure. For a better understanding of the present invention, its operation, advantages and specific objects attained by its use, reference should be had to the accompanying drawings and descriptive matter in which preferred embodiments of the invention are illustrated and described.

BREIF DESCRIPTION OF THE DRAWINGS

DESCRIPTION OF PREFERRED EMBODIMENT

The present invention will be discussed hereinafter in detail in terms of the preferred embodiment of an apparatus and method for the restoration of an optical network. In the following description, numerous specific details are set forth in order to provide a thorough understanding of the present invention. It will be obvious, however, to those skilled in the art that the present invention may be practiced without these specific details.

In a translucent optical network it is possible to strategically distribute regeneration capability around an entire network. Switches that have an electronic regeneration function can be shared by all lightpaths in the network as a whole.

Figure 1:
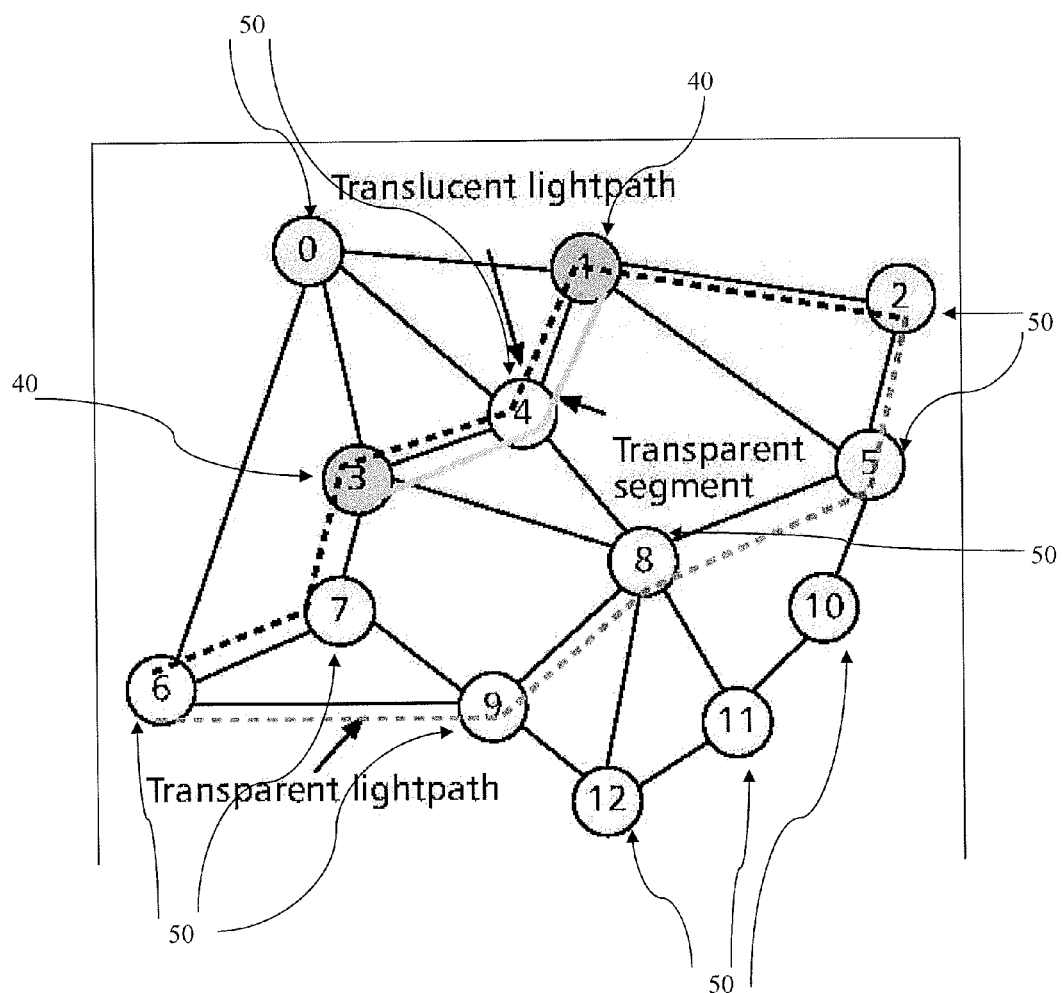
FIG. 1 illustrates a translucent optical network according to the prior art with sparsely placed opaque nodes.

FIG. 1 which shows the current state of the art, describes one such implementation and is based on sparse placement of opaque or electronic switches 40. Here, one deploys a relatively small number of strategically chosen opaque (i.e., electronic) nodes, at which wavelength conversion and regeneration is possible. All other nodes are lower-cost optically transparent OXCs 50. Opaque nodes 40 can regenerate optical signals and convert wavelengths electronically, while transparent nodes 50 have the optical switching function only. The decision between optical or electronic switching is based on the signal quality (e.g., BER) of the lightpath, i.e., whether regeneration is required before further transmission.

Associated with the concept of a translucent network, there are two types of lightpaths: translucent and transparent. A light path is called translucent if there are some opaque or regeneration nodes en route for signal regeneration (and wavelength conversion); a lightpath is called transparent if there are no opaque or regeneration nodes en route. We also refer to the lightpath segment between two neighbouring opaque or regenerating nodes as a transparent segment. The reference to the word "neighbouring" is taken to mean a node which is situated near to or adjacent to another node. In FIG. 1, lightpath (2-5-8-9-6) is transparent because all nodes en route are transparent, while lightpath (2-1-4-3-7-6) is translucent because nodes 1 and 3 are opaque. The translucent lightpath is made up of three successive transparent segments, including segments (2-1), (1-4-3) and (3-7-6).

Figure 2:
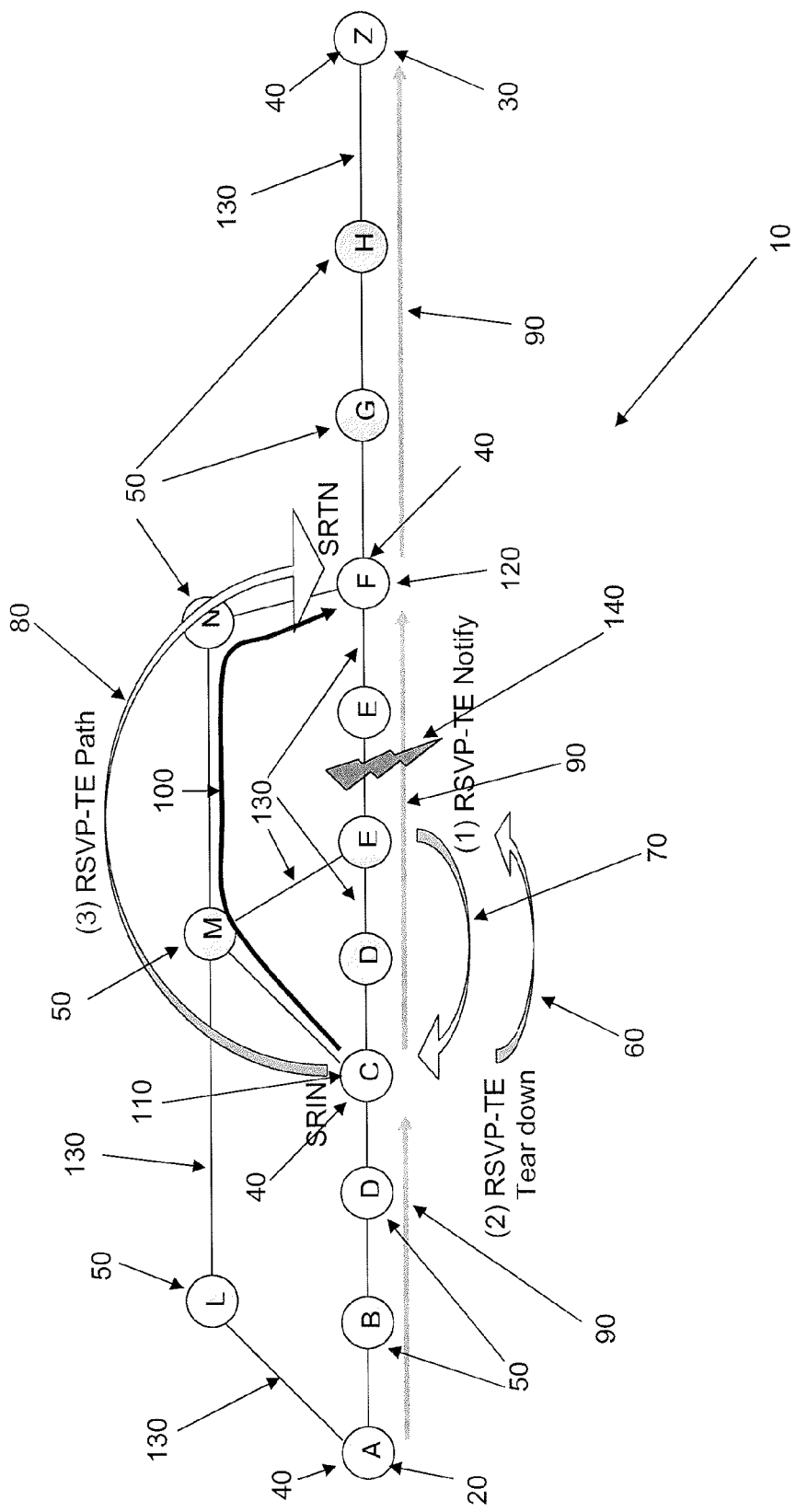
FIG. 2 shows a segment restoration scheme for an optical network in accordance with an embodiment of the present invention.
Figure 6:
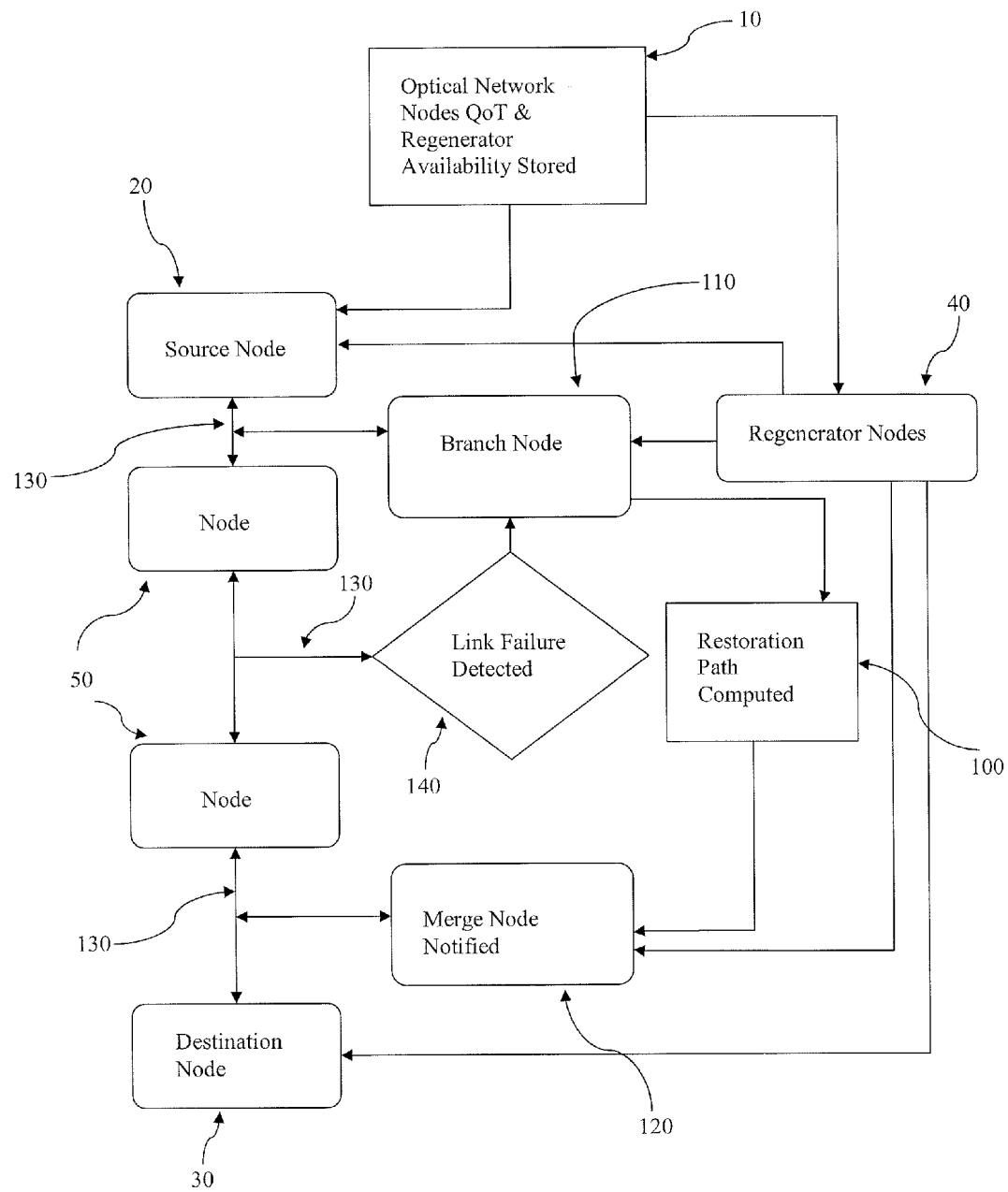
FIG. 6 shows a flow diagram for an optical network in accordance with an embodiment of the present invention.

FIGS. 2 and 6 show a segment restoration scheme 10 for an optical network according to the present invention. A segment restoration scheme 10 is used for example in a GMPLS-controlled translucent optical network. The segment restoration scheme 10 is used in order to overcome the problem of regenerator availability information inaccuracy. The segment restoration scheme 10 exploits the regenerators already in-use by working lightpaths, for restoration purposes. The restoration path 100 or backup segment is, thus, defined between regenerator nodes 40 (and terminal nodes) and is selected to guarantee quality of transmission.

RSVP-TE is a resource reservation protocol which generally allows the establishment of GMPLS label switched paths, taking into consideration network constraint parameters such as the available bandwidth. RSVP-TE supports the reservation of resources across an optical network.

The optical translucent network comprises a source node 20 and a destination node 30 interconnected by links 130. The translucent network is a distributed GMPLS control plane consisting of N nodes (40, 50) with optical cross-connecting functionalities and bi-directional wavelength division multiplexing (WDM) links 130. WDM being the transmission of two or more signals over (relatively) widely spaced wavelengths, on a single fiber or fiber pair. Each link 130 supports W wavelengths in each direction. M nodes 40 where (M≤N) are equipped with a regeneration module composed of r≤W wavelength-independent regenerators 40.

The basic process of communicating using fiber-optics involves the following basic steps: Creating the optical signal using a transmitter, relaying the signal along the fiber, ensuring that the signal does not become too distorted or weak, and receiving the optical signal and converting it into an electrical signal. As some signal loss occurs when the light is transmitted through the fiber, especially over long distances such as with undersea cables, one or more optical regenerators 40 are required to boost the degraded light signals.

FIGS. 2 and 6 show a source node 20 from which the optical signal is transmitted. The source node 20 and the destination node 30 are separated by a number of nodes 40, 50 interconnected by optical bi-directional WDM links 130. The nodes 40, 50 consist of a subset of electronic nodes 40 and transparent or optical nodes 50. The electronic nodes 40 function as both a wavelength conversion device and regeneration device. All other nodes 50 are lower-cost optically transparent or optical nodes 50. Opaque nodes 40 can regenerate optical signals and convert wavelengths electronically, while transparent nodes 50 have the optical switching function only. Each of the electronic nodes 40 have database storage available to store both a quality of transmission (QoT) parameter and regenerator availability 160.

During the signaling phase, network nodes 40, 50 exploit RSVP-TE extensions to acquire both QoT parameters and number of available regenerators 160 associated with the working or traversed path 90. Each traversed electronic node 40 stores QoT and regenerator availability 160 information in local databases, i.e. QoT Parameter Database (QPD) and Regenerator Database (RD) respectively.

We measure the QoT of a lightpath by its bit error rate (BER), which should remain below a threshold set by the network manager to ensure almost error-free data transmission. To estimate BERs, we use the relationship between BER and the corresponding global quality factor (Q factor). To evaluate the QoT and predict the BER along a lightpath a number of factors are taken into consideration. Some of these factors which form the QoT parameters are namely chromatic dispersion, polarization mode dispersion, optical signal to noise ratio and nonlinear phase shift.

By exploiting QPD and RD, upon a lightpath provisioning request, the source node 20 computes the route and selects intermediate electronic nodes 40 where regeneration should take place in order to ensure QoT in each optical segment 130. Then, source node 20 indicates selected regenerator nodes 40 in the RSVP-TE regenerator object (RO). Exploiting RO, each traversed node is informed about the lightpath nodes performing regeneration. The passing of a resource reservation request (RSVP) allows each of the plurality of nodes 40 to store the quality of transmission parameter and regenerator availability.

When a failure 140 occurs in the working path 90 from the source node 20 to the destination node 30, the nodes detecting the failure 50E are also the nodes 50 which are adjacent to the failure 140. Upon link failure 140, the node detecting the failure, e.g. the upstream node 50E of the failed link 140, sends an RSVP-TE Notify message 70 to an upstream node 110. The upstream node 110 may be defined as the segment restoration scheme initiating node 110 (SRIN) or branch node and includes a regenerator or is an electronic node 40. The branch node 110 is the upstream neighbouring node closest to the failed link 140 among the source node 20 and the electronic nodes 40 regenerating the disrupted lightpath 90. The branch node 110 computes or performs a constraint shortest path first computation to determine a backup or restoration optical path 100 to a downstream node 120, which may be further defined as the segment restoration terminating node (SRTN) 120 or merge node.

The most straight forward approach to computing a routing connection is to always choose the same fixed route for a given source-destination pair. One example of such an approach is fixed shortest-path routing. The shortest-path route for each source-destination pair is calculated off-line using standard shortest-path algorithms, such as Dijkstra's algorithm or Bellman-Ford algorithm, and any connection between the specified pair of nodes is established using the pre-determined route.

Optical paths can be automatically set up and torn down using dynamic signaling protocols such as RSVP. Since optical paths are typically created subject to multiple constraints, the algorithm to determine an optimal path under such constraints, known as Constraint-based Shortest Path First (CSPF), becomes a vital part of GMPLS design and implementation. By its name, CSPF—is an extension to the traditional shortest-path (SPF) algorithm with a set of constraints attached.

The merge node 120 is the neighbouring downstream node connected to the failed link which is the closest downstream node 40 among the nodes regenerating the disrupted lightpath 90 and the destination node 30. The restoration path 100 being based on the quality of transmission parameter and regenerator availability 160 information stored at each of the electronic nodes 40. The final step in the restoration of the signal from the source 20 to the destination node 30 involves restoring the path between the source node 20 and the destination node 30 using the restoration path 100.

Figure 7:
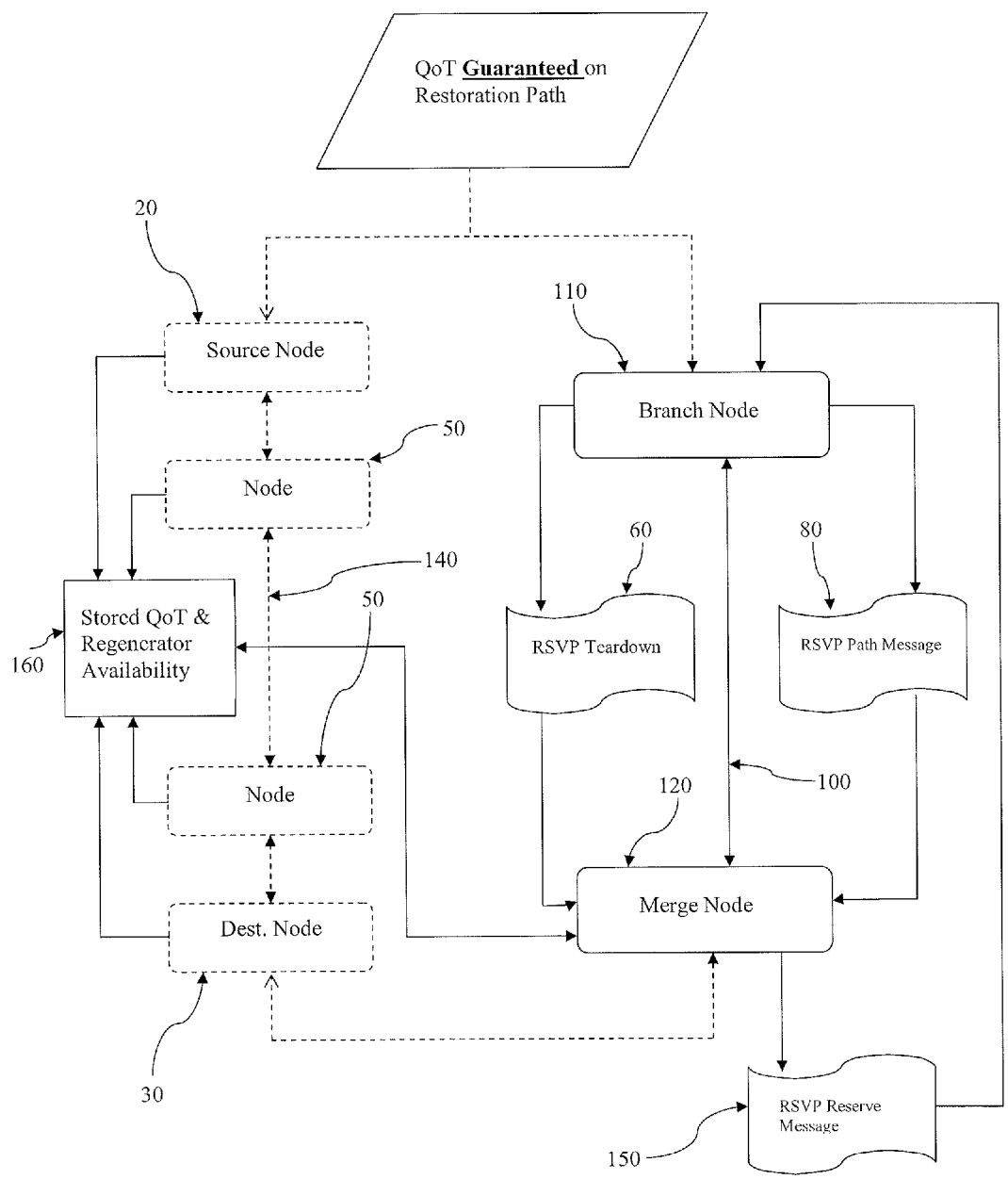
FIG. 7 shows a flow diagram for when quality of transmission can be guaranteed on the restoration segment according to an embodiment of the present invention.

FIG. 7 shows the steps taken if quality of transmission (evaluated by using QPD) can be ensured on the computed optical segment or restoration path 100, the branch node 110 sends an RSVP-TE Teardown message 60 to the merge node 120 to free resources along the failed segment 140. Then, the branch node 110 sends an RSVP-TE Path message 80 to the merge node 120 to gather available resource information along the backup or restoration segment 100. Upon reception of the Path message 80, the merge node 120 selects an available wavelength and sends the branch node 110 an RSVP-TE reservation message 150 to reserve the resources for restoration. When the branch node 110 receives the reservation message 150, the lightpath is restored.

Figure 8:
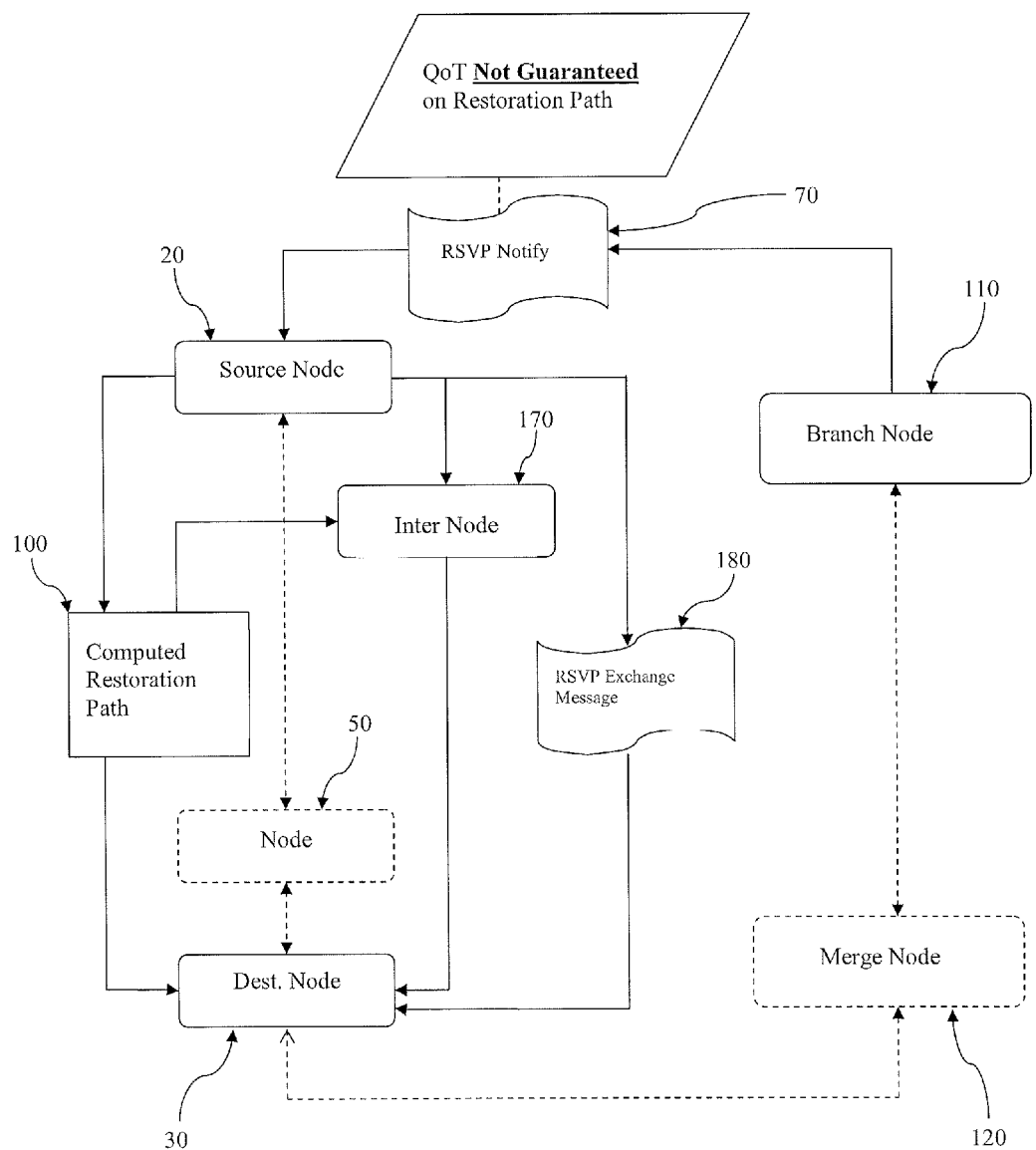
FIG. 8 shows a flow diagram for when the quality of transmission can not be guaranteed on the restoration segment according to an embodiment of the present invention.

FIG. 8 shows the steps taken if the quality of transmission cannot be ensured, an RSVP-TE notify message 70 is sent to the lightpath source node 20 by the branch node 110. Upon receiving the RSVP-TE notify message 70, the source node 20 computes a backup or restoration 100 route to the destination node 30 and selects intermediate regenerator nodes 170 to ensure quality of transmission in each optical segment 130 as in the provisioning phase. Then an RSVP-TE message exchange 180 is triggered from source node 20 to destination node 30 to free resources along the failed path 90 and to reserve resources on the computed backup or restoration route 100.

Figure 9:
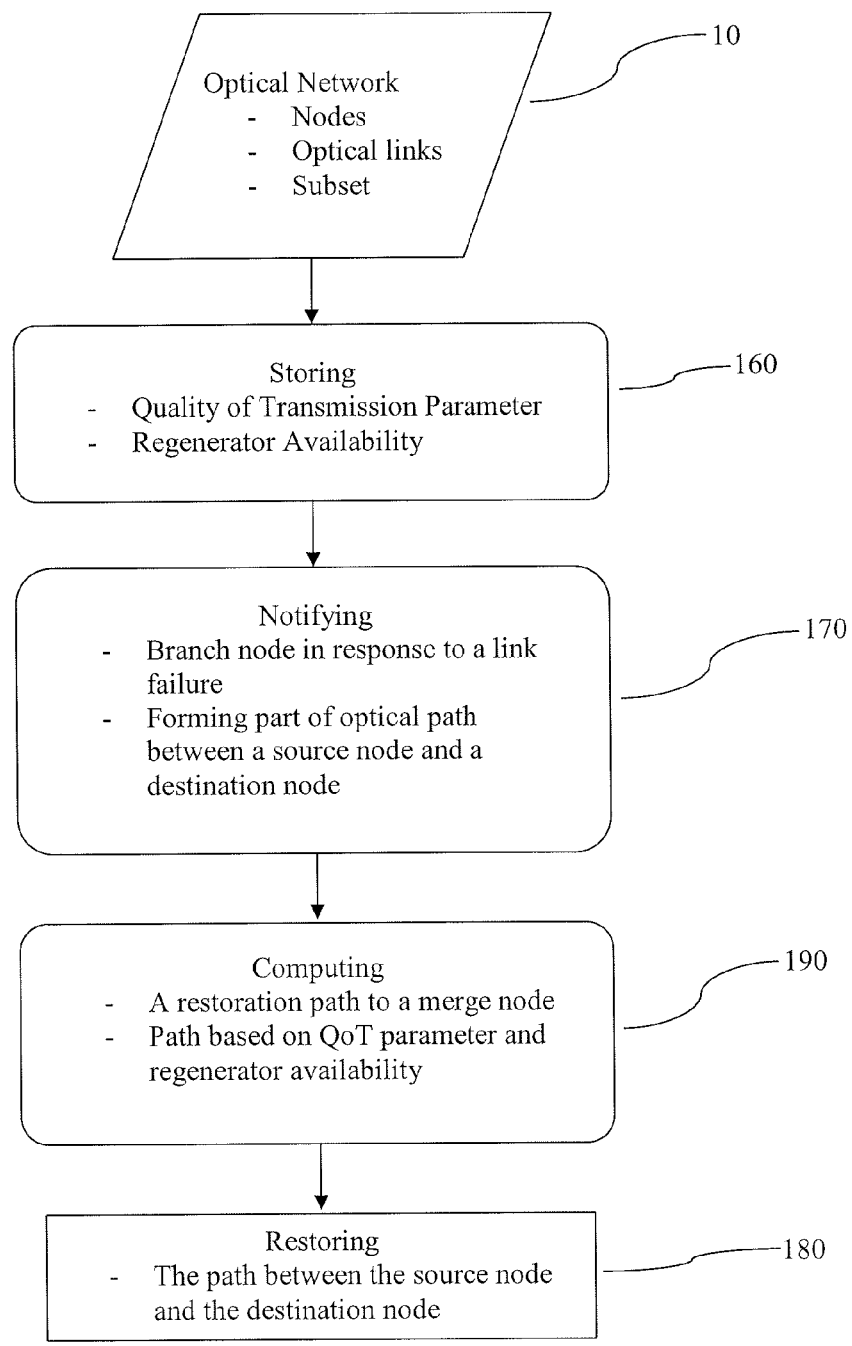
FIG. 9 shows a flow diagram of the method of an aspect in accordance with the present invention.

FIG. 9 shows a flow diagram of the method of the present invention. The optical network 10 comprises a plurality of nodes 40, 50 interconnected with each other by optical links 130, a subset of the nodes 40 each comprising a regenerator. The method comprising, storing 160 a quality of transmission parameter and a regenerator availability at each of the plurality of nodes 40, 50. When a failure 140 is detected a branch node 110 having an available regenerator is notified 170 of the failure within a link 130 which forms part of the path between a source node 20 and a destination node 30. The branch node 110 then computes 190 a restoration path 100 to a merge node 120. The restoration path 100 being based on the quality of transmission parameter and regenerator availability information. Finally the path between the source node 20 and the destination node 30 is restored 180 using the restoration segement 100.

By way of example and to test the present invention the following example is provided.

Figure 5:
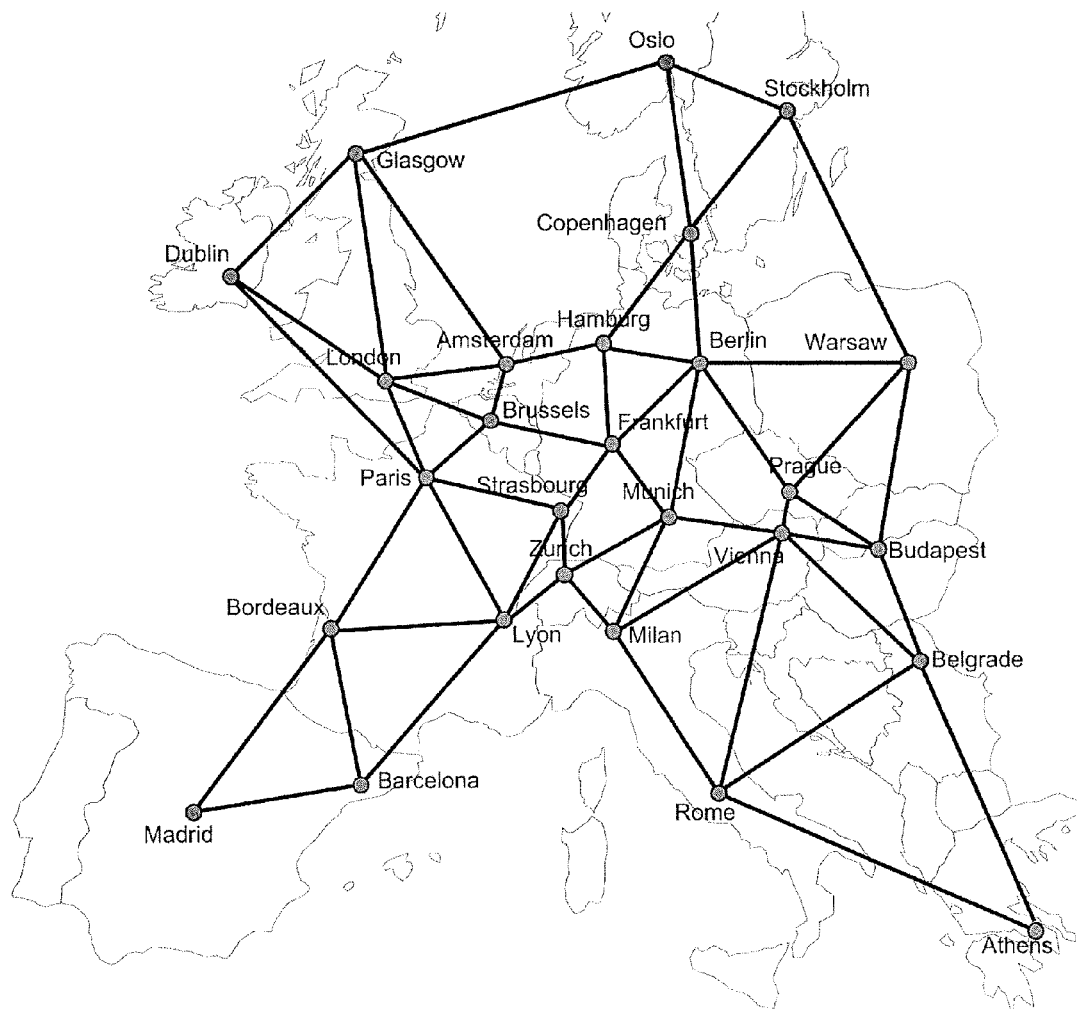
FIG. 5 shows a Pan-European network topology used to evaluate the performance of a segment restoration scheme in accordance with the present invention.

The performance evaluation of the segment restoration scheme 10 is carried out by means of a custom C++event-driven simulator on the Pan-European network topology as shown in FIG. 5, with N=27, L=55, W=40, M=7, and r=4. The M nodes in FIG. 5 are Munich, Rome, Milan, Paris, Vienna, Berlin and Lyon. The M nodes with regeneration capability are placed according to the regenerator placement algorithm based on signal quality prediction. Lightpath requests are uniformly distributed among the source-destination pairs. Both inter-arrival and holding times of the lightpath requests are exponentially distributed with an average of $1/\lambda=10^4$ s and $1/\mu$ respectively. Upon reaching steady state conditions in provisioning, a link failure is generated with uniform distribution. Simulation results are plotted with the confidence interval at 95% confidence level. The quality of transmission model accounts for noise, chromatic dispersion, polarization mode dispersion and self phase modulation. Segment restoration scheme 10 performance is compared against path restoration scheme (PRS). In PRS a backup route is always computed by the source node toward the destination. During both provisioning and PRS, the route and the regenerator nodes are selected by exploiting QPD and RD. To limit the regenerator usage, a constraint on the maximum number of regenerator nodes per lightpath Nr=1 is imposed before and after the failure. Performance are evaluated in terms of: forward blocking experienced during the forward signaling phase of the restoration (i.e., Path message is blocked due to the lack of available wavelengths), backward blocking experienced during the backward signaling phase (i.e., Reservation message is blocked due to resource contentions), and regenerator blocking due to lack of regenerators or inaccurate regenerator availability information.

Figure 3:
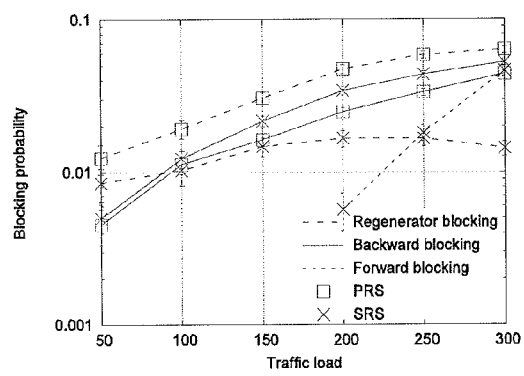
FIG. 3 shows a graph of the restoration blocking probability contributions experienced by a segment restoration scheme in accordance with the present invention.
Figure 4:
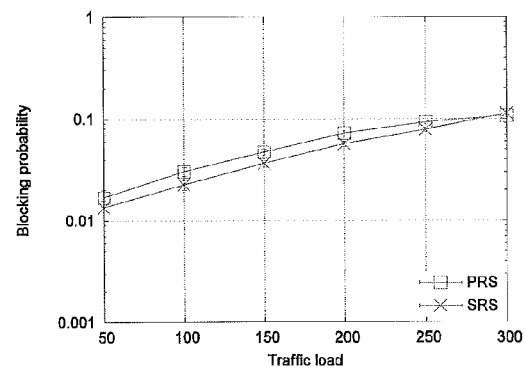
FIG. 4 shows a graph of the overall restoration blocking probability experienced by a segment restoration scheme in accordance with the present invention.

FIGS. 3 and 4 show the results of the performance evaluation of the segment restoration scheme 10 as carried out by means of a custom C++event-driven simulator on the Pan-European network topology as shown in FIG. 5. FIG. 3 shows a graph of the restoration blocking probability contributions experienced by a segment restoration scheme 10 in accordance with the present invention and FIG. 4 shows a graph of the overall restoration blocking probability experienced by a segment restoration scheme 10 in accordance with the present invention. FIG. 3 shows the several contributions of the restoration blocking versus the traffic load. The segment restoration scheme 10 reduces regenerator blocking with respect to the path restoration scheme. In SRS 10 fewer regenerator nodes 40 need to be specifically reserved during restoration and thus inaccurate information on regenerator availability has less impact on the blocking.

However, forward blocking becomes significant in segment restoration schemes 10 for high traffic loads. This is due to the high concentration of restoration segments (and thus the high resource usage) on the links 130 around the failed link 140. Forward blocking is experienced by path restoration schemes but to a less degree than in a segment restoration scheme because backup path links are widespread. For the same reason, in segment restoration schemes 10, resource contentions are more probable and backward blocking experienced by segment restoration schemes 10 is higher than in path restoration schemes.

FIG. 4 shows the overall restoration blocking probability versus the traffic load, i.e., $\lambda/\mu$. The segment restoration scheme 10 achieves lower blocking probability than a path restoration scheme. Finally, a segment restoration scheme 10 and a path restoration scheme are compared in terms of mean restoration time ($\Delta T$), defined as the mean time between the failure 140 and the instant in which a reservation message 70 reaches the branch node 110 (in case of SRS) or the source 20 (in case of PRS). The segment restoration scheme 10 decreases the restoration time achieved by that of the path restoration scheme by 15% assuming a negligible packet processing time.

The present invention provides a different approach, hereafter addressed as Signaling Approach (SA), to encompass QoT parameters in the GMPLS protocol suite. SA is based on the enhancement of the GMPLS signaling protocol, e.g. Resource Reservation Protocol with Traffic Engineering extensions (RSVP-TE). In SA, lightpath routes from source to destination are dynamically computed by exploiting the standard Open Shortest Path First with Traffic Engineering (OSPF-TE) extensions, i.e. without taking into account QoT parameters. Only during lightpath establishment, the lightpath QoT is dynamically computed through the signaling protocol. QoT is evaluated through an Optical Signal to Noise Ratio (OSNR)-based model.

In this model, we account for some non-linear effects, i.e. Self-Phase Modulation (SPM), through the Non Linear Phase Shift parameter denoted by $\phi_{NL}$. In this model, Optical Signal to Noise Ratio (OSNR) represents the QoT. Beside noise, the modelled impairments are: Polarization Mode Dispersion (PMD), Chromatic Dispersion (CD) and Self Phase Modulation (SPM). All modelled impairments are respectively represented by four parameters (carried in the QoT parameter (QP) sub-objects) that cumulate linearly: 1/OSNR, $PMD^2$, CD and $\phi_{NL}$.

The admission control at the destination node accepts the lightpath establishment if:
(i) the cumulated PMD value is within the acceptable range (e.g., below $PMD_{MAX}$=10 ps)
(ii) the cumulated $\phi_{NL}$, value is within the acceptable range (e.g., below $\phi_{NLMAX}$=1 rad)
(iii) the cumulated OSNR value is above the $OSNR_{th}$ threshold. $OSNR_{th}$ is obtained from the $OSNR_{min}$ value determined by the cumulated CD and $\phi_{NL}$ values and from the margins specified to account for non modelled impairments (i.e., $OSNR_{th}$=$OSNR_{min}$+Margins). In particular, $OSNR_{min}$ specifies the minimum OSNR value required by the receiver to obtain a Bit Error Rate (BER) equal to $10^{-3}$ before FEC (forward error correction codes implemented in the receiver) in presence of given values of CD and $\phi_{NL}$. In order to assure the reliability of the model, worst-case margins (e.g., 6 dB) are considered to account for non modelled impairments such as Polarization Dependant Loss, filtering, crosstalk, system ageing and fluctuation, and other non linear effects.

Throughout the description the terms upstream node and downstream node can refer to any suitable node within the network and is used in this specification merely to indicate a location for the node. The term is not meant to indicate a restriction to the type of node that may be used.

Although the present invention has been illustrated and described with respect to exemplary embodiment thereof, it should be understood by those skilled in the art that the foregoing and various other changes, omission and additions may be made therein and thereto, without departing from the scope of the invention. Therefore the present invention should not be understood as limited to the specific embodiment set out above but to include all possible embodiments which can be embodied within a scope encompassed and equivalent thereof with respect to the features set out in the appended claims.

The invention claimed is:

1. A method of restoration for an optical network, the network comprising a plurality of nodes interconnected with each other by optical links, a subset of the nodes each comprising a regenerator, the method comprising:
storing a quality of transmission parameter and a regenerator availability at each of the plurality of nodes;
notifying a branch node in response to detecting a failure within a link forming part of the path between a source node and a destination node, wherein the branch node is the neighbouring upstream node upstream of the link failure, the branch node having a regenerator;
the branch node computing a restoration segment to a merge node having a regenerator which is a neighbouring downstream node which is downstream of the link failure, the restoration segment being based on the quality of transmission parameter and regenerator availability information;
restoring the path between the source node and the destination node using the restoration segment.

2. The method according to claim 1, further comprising passing a resource reservation request to each of the plurality of nodes for storing the quality of transmission parameter and regenerator availability.

3. The method according to claim 2 wherein if the quality of transmission can be guaranteed on the restoration segment, the branch node sends a reservation request teardown message to the merge node to free resources along the failed segment, wherein the branch node sends a reservation path message to the merge node to gather the quality of transmission parameter and regenerator availability stored at each of the plurality of nodes along the restoration segment, the merge node selects an available wavelength and sends the branch node a reservation message to reserve the resources for restoration of the failed optical segment.

4. The method according to claim 2 wherein if the quality of transmission cannot be guaranteed a reservation notify message is sent to the source node by the branch node upon receiving the reservation notify message the source node computes a restoration path to the destination node and selects an intermediate regenerator node to ensure the quality of transmission, a reservation message exchange is triggered from the source node to the destination node to free resources along the failed optical path and to reserve resources on the restoration path.

5. The method according to claim 1, wherein the optical network comprises a generalised multi-protocol label switching (GMPLS) control plane.

6. An optical network, comprising a plurality of nodes interconnected with each other by optical links, a subset of nodes each comprising a regenerator, the apparatus comprising:
a database for storing a quality of transmission parameter and a regenerator availability at each of the plurality of nodes;
a source node and a destination node;
a branch node arranged to receive a notification in response to a failure within a link forming part of the path between the source node and the destination node, wherein the branch node is the neighbouring upstream node upstream of a link failure, the branch node having a regenerator;
the branch node further arranged to compute a restoration segment to a merge node;
the merge node having a regenerator, the merge node is a neighbouring downstream node which is downstream of the link failure, the restoration segment being based on the quality of transmission parameter and regenerator availability information;
the network arranged to restore the path between the source node and the destination node using the restoration segment.

7. The apparatus according to claim 6, further comprising passing a resource reservation request to each of the plurality of nodes for storing the quality of transmission parameter and regenerator availability.

8. The apparatus according to claim 7 wherein if the quality of transmission can be guaranteed on the restoration segment the branch node sends a reservation request teardown message to the merge node to free resources along the failed segment, wherein the branch node sends a reservation path message to the merge node to gather the quality of transmission parameter and regenerator availability stored at each of the plurality of nodes along the restoration segment, the merge node selects an available wavelength and sends the branch node a reservation message to reserve the resources for restoration of the failed optical segment.

9. The apparatus according to claim 7 wherein if the quality of transmission cannot be guaranteed a reservation notify message is sent to the source node by the branch node upon receiving the reservation notify message the source node computes a restoration path to the destination node and selects an intermediate regenerator node to ensure quality of transmission, a reservation message exchange is triggered from the source node to the destination node to free resources along the failed optical path and to reserve resources on the restoration path.

10. The apparatus according to claim 6, wherein the optical network comprises a generalised multi-protocol label switching (GMPLS) control plane.

11. A node for an optical network, comprising a plurality of nodes interconnected with each other by optical links, a subset of the nodes each comprising a regenerator, the node comprising:
 a regenerator;
 a database for storing a quality of transmission parameter and a regenerator availability;
 the node is arranged to support a path between a source node and a destination node of the optical network;
 the node is adapted to receive notification of a link failure within a link forming part of the path between a source node and a destination node, the node is the neighbouring upstream node from the link failure;
 wherein the node computes a restoration segment to a merge node, the restoration segment being based on the quality of transmission parameter and regenerator availability information.

12. The node according to claim 11, further comprises restoring the path between the source node and the destination node using the restoration segment.

13. The node according to claim 11, further comprising passing a resource reservation request to each of the plurality of nodes for storing the quality of transmission parameter and regenerator availability.

14. The node according to claim 11 wherein if the quality of transmission can be guaranteed on the restoration segment the node sends a reservation request teardown message to the merge node to free resources along the failed segment, wherein the node sends a reservation path message to the merge node to gather the quality of transmission parameter and regenerator availability stored at each of the plurality of nodes along the restoration segment, the merge node selects an available wavelength and sends the node a reservation message to reserve the resources for restoration of the failed optical segment.

15. The node according to claim 11 wherein if the quality of transmission cannot be guaranteed a reservation notify message is sent to the source node by the node upon receiving the reservation notify message the source node computes a restoration path to the destination node and selects an intermediate regenerator node to ensure quality of transmission, a reservation message exchange is triggered from the source node to the destination node to free resources along the failed optical path and to reserve resources on the restoration path.

16. The node according to claim 11, wherein the optical network comprises a generalised multi-protocol label switching (GMPLS) control plane.

17. The, node according to claim 16, wherein the quality of transmission parameter and the regenerator availability information are enabled into the GMPLS control plane using extensions of RSVP-TE.

18. A method of operating a node in an optical network, the node comprising a regenerator and the network comprising a plurality of other nodes interconnected with each other by optical links, a subset of the other nodes each comprising a regenerator, the method comprising:
 storing a quality of transmission parameter and a regenerator availability at the node;
 notifying the node in response to detecting a failure within a link forming part of the path between a source node and a destination node, wherein the node is the neighbouring upstream node upstream of the link failure;
 computing a restoration segment to a merge node having a regenerator which is a neighbouring downstream node which is downstream of the link failure, the restoration segment being based on the quality of transmission parameter and regenerator availability information;
 restoring the path between the source node and the destination node using the restoration segment.

19. The method according to claim 18, further comprising passing a resource reservation request to each of the plurality of nodes for storing the quality of transmission parameter and regenerator availability.

20. The method according to claim 18 wherein if the quality of transmission can be guaranteed on the restoration segment, the node sends a reservation request teardown message to the merge node to free resources along the failed segment, wherein the node sends a reservation path message to the merge node to gather the quality of transmission parameter and regenerator availability stored at each of the plurality of nodes along the restoration segment, the merge node selects an available wavelength and sends the node a reservation message to reserve the resources for restoration of the failed optical segment.

21. The method according to claim 18 wherein if the quality of transmission cannot be guaranteed a reservation notify message is sent to the source node by the node upon receiving the reservation notify message the source node computes a restoration path to the destination node and selects an intermediate regenerator node to ensure the quality of transmission, a reservation message exchange is triggered from the source node to the destination node to free resources along the failed optical path and to reserve resources on the restoration path.

22. The method according to claim 18, wherein the optical network comprises a generalised multi-protocol label switching (GMPLS) control plane.

23. The method according to claim 22, wherein the quality of transmission parameter and the regenerator availability information are enabled into the GMPLS control plane using extensions of RSVP-TE.

* * * * *